United States Patent [19]

Ebata et al.

[11] 4,163,074
[45] Jul. 31, 1979

[54] METHOD FOR FAST ADHESION OF SILVER TO NITRIDE TYPE CERAMICS

[75] Inventors: Yoshihiro Ebata, Kawanishi; Yasuo Toibana, Ikeda; Tsuneo Uetsuki, Kawanishi; Saburo Kose; Makoto Kinoshita, both of Ikeda, all of Japan

[73] Assignee: Agency of Industrial Science & Technology, Ministry of International Trade & Industry, Tokyo, Japan

[21] Appl. No.: 897,372

[22] Filed: Apr. 18, 1978

[30] Foreign Application Priority Data

Apr. 20, 1977 [JP] Japan .................................. 52-46221

[51] Int. Cl.$^2$ ............................................. C04B 41/38
[52] U.S. Cl. .................................... 427/229; 427/125; 427/404; 427/419 A; 427/376 B
[58] Field of Search ................... 427/125, 229, 419 R, 427/419 A, 376 R, 376 A, 404; 106/55, 65

[56] References Cited

FOREIGN PATENT DOCUMENTS 47-21569 6/1972 Japan .
954285 4/1964 United Kingdom ...................... 106/55

Primary Examiner—Ralph S. Kendall
Attorney, Agent, or Firm—Kurt Kelman

[57] ABSTRACT

A thin coating of silver is formed fast on the surface of a nitride type ceramic article by coating the surface of the ceramic article with a mixture consisting of copper sulfide and kaolin, subjecting the coated article to a thermal treatment in a nitrogen-containing atmosphere at a temperature in the range of from 900° to 1300° C., then overcoating the thermally treated ceramic article with silver carbonate and heating the overcoated article again in the nitrogen-containing atmosphere at a temperature in the range of from 700° to 900° C.

6 Claims, No Drawings

METHOD FOR FAST ADHESION OF SILVER TO NITRIDE TYPE CERAMICS

BACKGROUND OF THE INVENTION

This invention relates to a method for fast adhesion of a silver coating to nitride type ceramics.

Nitride type ceramics, excelling particularly in strength, resistance to thermal shocks and resistance to chemicals, have come to gain enthusiastic acceptance as refractory materials for use in applications the conventional oxidative type ceramics have failed to satisfy. In consequence of the recent development of new fields for the applications of high-temperature techniques, industries concerned are showing an inclination toward utilizing nitride type ceramics in special high-temperature insulators as well as in machine parts such as those in waste gas purification systems which are destined to be elevated instantaneously to high temperatures.

In many if not all cases, ceramic articles intended for industrial applications have their surface metallized, i.e. covered with thin coatings of various metals, in advance to their actual use.

Methods for the metallization suggested to date to the art include the molybdenum method and the silver-coating fusion method which is disclosed by Japanese Pat. No. 169,251. These methods invariably require the thermal treatment to be performed under vacuum or in an atmosphere of hydrogen gas and, therefore, call for highly advanced techniques. With a view to improving the methods described above, one of the present inventors has suggested a method for fast adhesion of a silver coating to the surface of an alumina ceramic article, which comprises first coating the surface of the alumina ceramic article with a mixture of copper sulfide and kaolin, heating the coated article in the atmosphere of an oxidative gas at a temperature of not less than 900° C. for thereby inducing a reaction of the reactants present, subsequently overcoating the thermally treated ceramic article with silver carbonate and heating it at a temperature of not less than 700° C. (Japanese Patent Publication No. 21569/1972).

These methods which have been suggested to date, when applied to adhesion of metals to nitride type ceramics, have invariably failed to provide fast adhesion of metals because the nitride type ceramics exhibit a very poor wetting property to molten metals.

An object of the present invention is to provide a method capable of fast, powerful adhesion of a silver coating to the suface of nitride type ceramics which have so far permitted no easy adhesion of metals by fusion.

SUMMARY OF THE INVENTION

To accomplish the object described above according to the present invention, there is provided a method which permits fast adhesion of silver to a nitride type ceramic article by coating the surface of the nitride type ceramic article with a mixture consisting of copper sulfide and kaolin, heating the coated ceramic article in a nitrogen-containing atmosphere at a temperature in the range of from 900° to 1300° C., then overcoating the thermally treated ceramic article with silver carbonate and heating the overcoated ceramic article again in a nitrogen-containing atmosphere at a temperature in the range of from 700° to 940° C.

When the ceramic article is coated with the aforementioned mixture of copper sulfide and kaolin and then subjected to the aforementioned thermal treatment in the nitrogen-containing atmosphere, there is formed an intermediary layer of a $SiO_2$—$Al_2O_3$—Cu system. This intermediary layer functions as a binder and, at the same time, permeates into the nitride type ceramic substrate. When this intermediary layer on the ceramic article is overcoated with silver carbonate and is subjected to the aforementioned thermal treatment so as to induce a thermal decomposition of the overcoat, there is formed in the intermediary layer a silver coating which adheres airtightly to the ceramic substrate with an exeptionally high strength.

The other objects of this invention as well as the characteristics thereof will become apparent from the following detailed description.

DESCRIPTION OF PREFERRED EMBODIMENT

One of the present inventors has succeeded in developing a method for fast adhesion of silver to alumina ceramics as described above. This method, however, has proved entirely inapplicable to adhesion of silver to nitride type ceramics. This is because the nitride type ceramics, unlike ceramics of other types, exhibit a very poor wetting property to molten metals.

The inventors focused particular attention on the problem described above and made a devoted study in search of a method capable of producing nitride type ceramics having silver adhered to the surface with an exceptionally high strength and which, therefore, are stable chemically and excellent in resistance to heat. They have consequently ascertained that metallic silver is caused to adhere fast and powerfully to the surface of a nitride type ceramic article when the surface of the nitride type ceramic article is coated with a mixture consisting of copper sulfide and kaolin and the coated ceramic article is heated in a nitrogen-containing atmosphere at a temperature of not less than 900° C. for thereby inducing a reaction of the reactants present, the surface of the thermally treated ceramic article is subsequently overcoated with silver carbonate and the overcoated ceramic article is subjected to a thermal treatment again in a nitrogen-containing atmosphere at a temperature of not less than 700° C. This knowledge has led to the accomplishment of this invention.

The nitride type ceramics to which the present invention is directed are not specifically limited. As typical exmaples of such nitride type ceramics, there may be cited silicon nitride, aluminum nitride and boron nitride. The method of this invention can be effectively applied to all these nitride type ceramics.

One salient characteristic of the method of this invention resides in the fact that the mixture of copper sulfide and kaolin applied to coat the surface of a nitride type ceramic article is heated in the nitrogen-containing atmosphere at a temperature of not less than 900° C. In consequence of this thermal treatment, an intermediary layer composed of the three components, copper, silica and alumina is formed on the ceramic substrate. In the meantime, the ceramic itself partially undergoes fusion so that part of the intermediary layer permeates into the ceramic substrate and induces a reaction. This reaction most likely accounts for the fast adhesion of silver to the ceramics.

For the present invention, it is essential that the thermal treatment mentioned above should be carried out in a nitrogen-containing atmosphere. If this thermal treatment is carried out in an oxidative atmosphere as involved in the methods suggested to date, the strength of the adhesion of the intermediary layer is notably inferior to the metamorphism of the nitride. In an extreme case, the metamorphism of the nitride predominates over the adhesion so much as to entail formation of cracks in the ceramic.

As the nitrogen-containing atmosphere, there can be used nitrogen gas alone or a mixture of nitrogen gas with air. Although the adhesion may be obtained in an atmosphere of air alone, generally it is obtained more quickly in a nitrogen-rich atmosphere. It is also permissible to carry out the thermal treatment in air while having nitrogen gas blown to the portion in which the metal is being applied to the nitride ceramic article. The fact that the thermal treatment performed in an inert nitrogen-containing atmosphere can bring about such a conspicuous effect on the nitride type ceramics which by nature exhibit an unusually poor wetting property to molten metals cannot be anticipated from the conventional method whereby the thermal treatment is performed in an oxidative atmosphere.

by the thermal treatment described above, copper sulfide is decomposed into copper and sulfur and this copper is combined with kaolin to produce a compound of a relatively low melting point consisting of three components, $Al_2O_3$—$SiO_2$—$Cu$, and forming an intermediary layer. The melting point of this intermediary-layer compound is lower than that of kaolin itself or that of copper sulfide itself. This intermediary-layer compound functions as what may well be called a binder and, at the same time, permeates into the nitride type ceramic substrate. The amount of copper which passes into the ceramic substrate owing to this permeation of the compound is found to be decisively larger than the amount of copper allowed to penetrate while the copper is still in the form of copper sulfide. Owing to the advantageous permeation of the intermediary-layer compound into the ceramic substrate, the thermal treatment can impart a great adhesive strength not attainable by the conventional methods. In the meantime, the sulfur which has issued from the decomposition of copper sulfide possesses a relatively high reactivity with the nitride and, therefore, is believed to accelerate the aforementioned permeation of the three-component intermediary-layer compound into the ceramic substrate. This is because the acceleration of the permeation which is obtained where copper sulfide is used as the copper source is not observed at all when, as the copper source, there is used other copper compound such as, for example, copper oxide or copper carbonate.

The effect described above improves in proportion as the purity of kaolin increases. That is to say, better results are obtained when the combined amount of extraneous components present in the kaolin whose principal components are alumina and silica is smaller.

As regards the mixing ratio of kaolin to copper sulfide, it is desirable to mix 1 to 20% by weight of the former to 99 to 80% by weight of the latter. The adhesive strength and permeability of the intermediary layer are both lowered when the amount of kaolin mixed with copper sulfide is greater than the upper limit of the range mentioned or smaller than the lower limit thereof.

The powdered mixture having copper sulfide and kaolin mixed with each other at the aforementioned ratio may be spayed, in its unaltered form, on the surface of the ceramic article under treatment. Alternatively, the mixture may be kneaded with an organic thickener such as balsam or printing ink into a pasty blend and, in this state, applied to the surface of the ceramic article. The amount of this mixture to be applied to coat the surface of the ceramic article is desired to be such that the combined weight of copper sulfide and kaolin per $cm^2$ of the surface of the ceramic article falls in the range of from 0.01 to 0.2 g. If the combined weight exceeds the upper limit 0.2 g of this range, there is a possibility that the difference of thermal expansion coefficient between the mixture and the ceramic article will be great enough to induce the phenomenon of peeling.

The ceramic article which has the mixture of copper sulfide and kaolin applied to coat the required portion of its surface is then subjected to a thermal treatment in the nitrogen-containing atmosphere.

Although the conditions for this thermal treatment are variable with the shape and size of the ceramic article under treatment or with the amounts of copper sulfide and kaolin, the thermal treatment is generally performed effectively at a temperature in the range of from 900° to 1300° C. for a period in the range of from 3 to 30 minutes. If the temperature is lower than the lower limit 900° C. of the range, the reaction mentioned above does not thoroughly proceed. If the temperature is higher than 1400° C., the mixture is deprived of its viscosity so seriously that it will no longer fit the formation of the intermediary layer.

After the intermediary layer has been formed on the surface of the ceramic article as described above, silver carbonate is further applied to overcoat the ceramic article. For effective overcoating, the silver carbonate is pulverized to a particle size of less than 1 $\mu$ and sprayed on the surface. The overcoated ceramic article is heated again in the same nitrogen-containing atmosphere at a temperature in the range of from 700° to 940° C., with the result that metallic silver is formed and it is caused to adhere fast to the surface. If the temperature is lower than 700° C., the formation of metallic silver and the adhesion of the overcoat to the intermediary layer are not sufficiently obtained. If the temperature is higher than 940° C., silver is fused so much as to render the operation difficult to control. Since thorough decomposition of silver carbonate constitutes the sole object of this thermal treatment, a period of not more than five seconds suffices for the completion of this treatment. The amount of silver carbonate thus applied to overcoat the ceramic article is desired to fall in the range of from 0.01 to 0.1 g as metallic silver per $cm^2$ of the surface of the ceramic article. If the amount is greater than the upper limit 0.1 of this range, there is a possibility that the difference in thermal expansion coefficient between the overcoat and the substrate will be large enough to induce the phenomenon of peeling.

As the result of the treatment described above, a thin coating of silver 1 to 5 $\mu$ in thicknes is formed on the surface of the nitride type ceramic article. The strength of the adhesion of this silver coating is variable with the kind of nitride type ceramic. It is more than about 430 $kg/cm^2$ in the case of silicon nitride, more than about 400 $kg/cm^2$ in the case of aluminum nitride and more than about 200 $kg/cm^2$ in the case of boron nitride.

The silver coatings thus formed on the various nitride type ceramics retain their strength of adhesion intact up to about 900° C. This indicates that the ceramics with such silver coatings are fully suitable for applications which require resistance to elevated temperatures.

Further on the thin coating of silver thus formed on the ceramic article, a metallic substance such as copper, iron, brass or Kovar can be overlaid through the medium of silver solder or soft solder. Two nitride type ceramic articles each having a thin coating of silver formed on their complementary surfaces can be joined face to face when they are placed one on top of the other with the coated surfaces in intimate contact and they are hearted in a nitrogen-containing atmosphere at a temperature exceeding 900° C. while they are being pressed against each other.

As is clear from the detailed description so far given, this invention permits airtight and powerful adhesion of a thin coating of silver to the surface of a nitride type ceramic article which has defied adhesion of metal, by coating the surface of the ceramic article with a mixture of copper sulfide and kaolin and subjecting the coated ceramic article to a thermal treatment in a nitrogen-containing atmosphere at a stated temperature for thereby giving rise to an intermediary layer composed of a $SiO_2$—$Al_2O_3$—$Cu$ system and, by virtue of this intermediary layer, improving the wetting property the surface of the nitride type ceramic article exhibits to silver enough to provide the aforementioned fast adhesion of silver. The treatments mentioned above can easily be carried out even in air. By thus providing slver-coated nitride type ceramic articles which excel in resistance to elevated temperatures, this invention serves to expand greatly those uses found for nitride type ceramics.

Now, the present invention will be described more specifically with reference to working examples. It should be noted that this invention is not limited to these examples.

EXAMPLE 1:

A mixture was formed of 95 parts by weight of copper sulfide and 5 parts by weight of kaolin. This mixture was kneaded with 15 parts by weight of balsam to produce a paste. To an article produced by sintering silicon nitride (relative density 98% and purity more than 96%), the paste was applied in an amount corresponding to 0.1 g of combined weight of copper sulfide and kaolin per $cm^2$ of the surface. The coated ceramic article was placed in an electric furnace and burnt in an atmosphere solely of nitrogen gas at a temperature of 1200° C. for 10 minutes. Thereafter, with the temperature lowered to 800° C. and powdered silver carbonate applied thereto at a rate of 0.1 $g/cm^2$, the ceramic article was burnt at 800° C. for three minutes. Consequently, a silver coating about 3 $\mu$ in thickness was formed on the surface of the ceramic article. To the silver-adhering surface of the ceramic article, a copper piece was soldered with silver solder. On a tensile tester the coating of the ceramic article was tested for strength of adhesion under a load of 500 kg at a rate of loading of 5 mm/min. The strength was found to be about 430 $kg/cm^2$, indicating that the silver coating was adhering to the ceramic article very strongly.

The procedure described above was repeated, except the thermal treatment of the ceramic article was performed in air in the place of the atmosphere of nitrogen gas while nitrogen gas was blown to the ceramic article under treatment. The results were the same as those described above. When the thermal treatment was carried out in an oxidative atmosphere in the place of the atmosphere of nitrogen gas, the strength of adhesion of the coating of silver was only about 50 $kg/cm^2$.

EXAMPLE 2:

By following the procedure of Example 1, an article 3: by burning aluminum nitride (relative density 98% and purity more than 96%) and an article produced by burning boron nitride (relative density 97% and purity more than 95%) were each treated under the same conditions to form a silver coating each on the surface of the ceramic articles. The thickness and adhesive strength of silver coating were about 3 $\mu$ and about 400 $kg/cm^2$ in the case of the ceramic article of aluminum nitride and about 2 $\mu$ and about 200 $kg/cm^2$ in the case of the ceramic article of boron nitride.

EXAMPLE 3

Two pieces of silver-adhering silicon nitride ceramic which were obtained under the same conditions as in Example 1 were piled one on top of the other with their coated surfaces in intimate contact and they were heated in an atmosphere of 50:50 nitrogen gas/air mixture (by volume) at a temperature of 900° C. for five minutes while they were pressed against each other at a pressure of 10 $kg/cm^2$. The joint piece thus obtained was tested for bending strength under a load applied at three points at a rate of loading of 5 mm/min. The strength was found to be about 350 $kg/cm^2$.

What is claimed is:

1. A method for fast adhesion of silver to a nitride type ceramic article, which comprises:
    coating the surface of the nitride type ceramic article with a mixture consisting of copper sulfide and kaolin, the mixing ratio of copper sulfide and kaolin being 99 to 80% by weight of the former to 1 to 20% by weight of the latter,
    heating the ceramic article coated with the mixture in a nitrogen-containing atmosphere at a temperature in the range of from 900° to 1300° C.,
    overcoating the thermally treated ceramic article with silver carbonate, and
    heating the ceramic article overcoated with silver carbonate in a nitrogen-containing atmosphere at a temperature in the range of from 700° to 940° C.

2. The method according to claim 1, wherein the nitride type ceramic is one member selected from the group consisting of silicon nitride, aluminum nitride and boron nitride.

3. The method according to claim 1, wherein the nitrogen-containing atmosphere in which the thermal treatment of the nitride type ceramic article is carried out is air and nitrogen gas is blown onto the ceramic article.

4. The method according to claim 3, wherein the thermal treatment in the nitrogen-containing atmosphere is carried out for a period of from 3 to 30 minutes.

5. The method according to claim 1, wherein the amount of the mixture of copper sulfide and kaolin to be applied to coat the surface of the ceramic article is in the range of from 0.01 to 0.2 g per $cm^2$ of the surface of the ceramic article.

6. The method according to claim 1, wherein the amount of silver carbonate to be applied to overcoat the ceramic article is in the range of from 0.01 to 0.1 g as metallic silver per $cm^2$ of the surface of the ceramic article.

* * * * *